United States Patent [19]

Herbert

[11] 4,227,785
[45] Oct. 14, 1980

[54] LIGHT IMAGE TRANSLATOR

[76] Inventor: Henry J. Herbert, Santa Barbara, Calif.

[21] Appl. No.: 34,437

[22] Filed: Apr. 30, 1979

Related U.S. Application Data

[63] Continuation of Ser. No. 837,880, Sep. 29, 1977, abandoned, which is a continuation of Ser. No. 675,636, Apr. 9, 1976, abandoned.

[51] Int. Cl.² .............. G03B 21/28; G05D 25/00; A63J 17/00; G02F 1/00
[52] U.S. Cl. .................. 353/50; 84/464 R; 350/6.5; 350/285; 353/98
[58] Field of Search ............ 353/1, 98, 99, 46, 50; 84/464; 350/65, 285, 289

[56] References Cited

U.S. PATENT DOCUMENTS

| | | | |
|---|---|---|---|
| 3,260,784 | 7/1966 | Wehrmann | 84/101 |
| 3,551,042 | 12/1970 | Brink et al. | 353/76 |
| 3,892,478 | 7/1975 | Lampkin | 353/99 |
| 3,969,972 | 7/1976 | Bryant | 84/464 |

*Primary Examiner*—Steven L. Stephan
*Attorney, Agent, or Firm*—Franklin D. Ubell

[57] ABSTRACT

A device for manipulating visual images such as those provided by a common slide projector, employing an audio transducer apparatus for controlling positioning of a mirror in response to vertical and horizontal control signals. Numerous control signals indicative of human operator movement are developed by a joy-stick control apparatus for selective application as vertical, horizontal and brightness control signals to the projector transducer system. Selectible automatic control capability is also provided by means of oscillator circuits, float circuitry and automatic brightness control and blanking circuitry.

1 Claim, 19 Drawing Figures

EXPLODED VIEW

| SWITCH POSITION | IB AND III B CONTROLLED BY | II B AND IV B CONTROLLED BY |
|---|---|---|
| ① | I PEDAL AND III PEDAL | II P AND IV P |
| ② | I P AND III P | II P AND IV P |
| ③ | IP, IS, III P AND III S (QUAD FADER) | |
| ④ | OFF | I P AND III P |
| ⑤ | I PEDAL AND III PEDAL | III P AND III S |

LIGHT IMAGE TRANSLATOR

This is a continuation, of application Ser. No. 837,880, filed Sept. 29, 1977 now abandoned which is a continuation of Ser. No. 675,636, filed Apr. 9, 1976 now abandoned.

BACKGROUND OF THE INVENTION

The subject invention relates to a device for manipulating visual images. More particularly the subject invention pertains to an electromechanical system capable of moving or translating projected images on a screen in both horizontal and vertical directions. As one aspect of the invention, operator control of the image manipulation is provided.

In the prior art, light spots have been manipulated by mirrors that are driven by audio transducers. The audio signals for the transducers have been typically provided by recorded musical stimuli. For example, mirrors have been attached to a membrane such as a speaker diaphram vibrated by acoustical signals. In another device, a number of pivotially mounted mirrors are oscillated about their respective pivotal axes in response to audio signals in order to manipulate a light spot.

It is an object of this invention to provide an improved light beam manipulation apparatus.

It is another objective of this invention to provide an improved transducer enabling complex manipulations of entire images such as those provided by a common slide projector.

It is still another object of the invention to interject the element of human control into the manipulation of visual images, resulting in a system which my be termed a "live animator". The system of the subject invention thus becomes a tool of art.

SUMMARY OF THE INVENTION

These and other objects and advantages of the subject invention are obtained by providing a very precisely controllable projector-transducer apparatus, which may then be driven by signals representative of body movements of a human operator. According to another aspect of the invention, such driving signals are developed by electromechanical apparatus and associated electronic control circuitry. According to still another aspect of the invention, the control circuitry may include circuitry enabling automatic control of aspects of image translation which are not easily controllable by the image translator operator.

BRIEF DESCRIPTION OF THE DRAWINGS

A preferred embodiment for implementing the just summarized invention will now be described in detail in conjunction with the drawings of which.

DETAILED DESCRIPTION OF THE PREFERRED EMBODIMENT OF THE INVENTION

Figure 1:
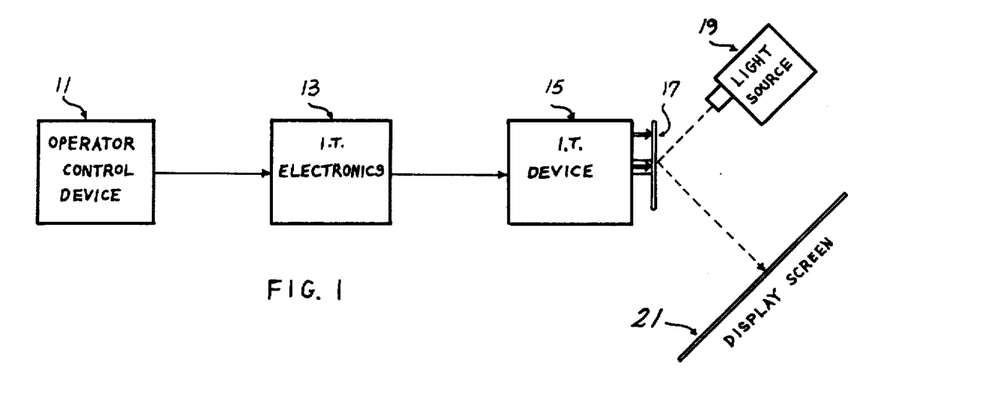
FIG. 1 is a conceptualized block diagram illustrating an image translator configured according to a preferred embodiment of the invention.

The general approach of the invention may be seen in FIG. 1. As shown, an operator controlled device 11 applies a signal representative of operator movement, for example, the movement of the human hand or foot, to electronics 13 which develop and control audio signals for driving an audio transducer 15. In practice a slide projector 19 or other collimated light source is aimed at close range, 2 to 5 inches at a 45° angle to an optically flat first surface mirror 17. The reflected beam leaves the mirror 17 at a nominal angle of 90° to the incident beam and is focused on a screen 21.

Figures 2, 3:
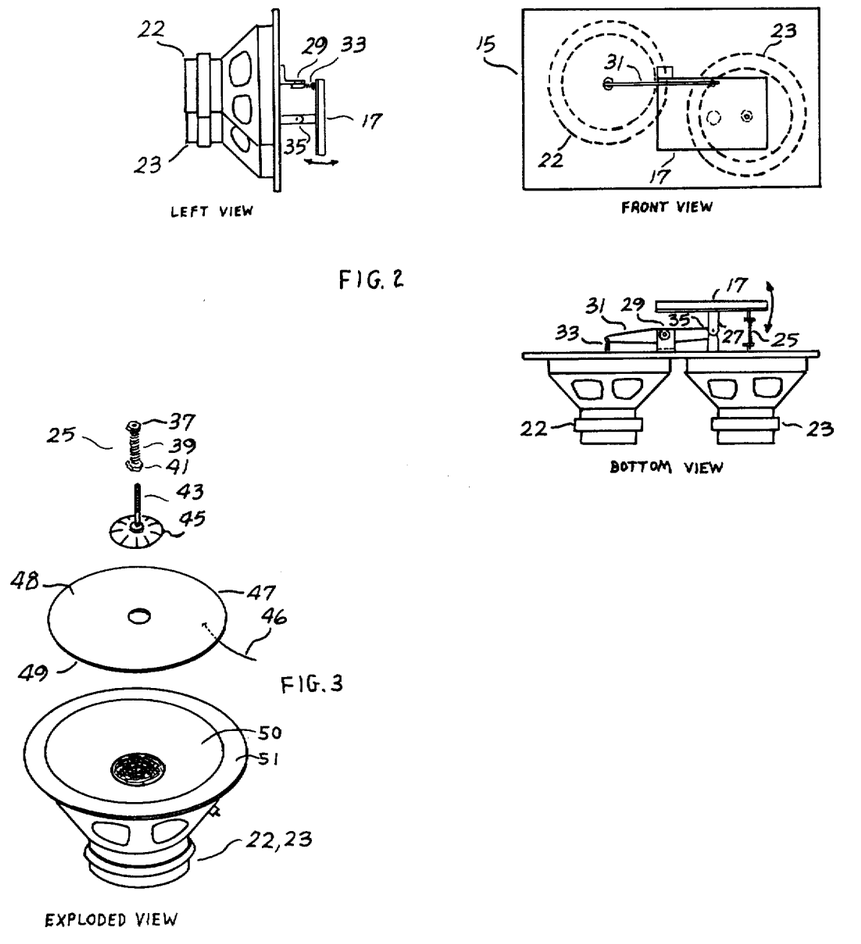
FIG. 2 is a drawing showing the (audio) transducer of the preferred embodiment of the projection.
FIG. 3 is an exploded view of the drive transducer of the preferred embodiment of the invention.

The particular structure of an audio transducer 15 and associated mirror 17 for use in the preferred embodiment of the invention is shown in more detail in FIGS. 2 and 3. The mirror 17 is mounted upon a universal joint 35 so that it may move both vertically and horizontally but not rotate. The mirror 17 has a horizontal drive point where it is attached to a horizontal drive linkage 25. The mirror 17 also has a vertical drive point where it is attached to a vertical drive lever 31, which pivots about a bearing 29 and is driven by a vertical linkage 33. The linkages 25 and 33 are free of slop in the direction of their respective axes. The vertical drive point of the lever 31 is attached to the mirror with a linkage similar to those of the vertical linkage 33 and the horizontal linkage 25. The vertical linkage 33 is driven by a vertical audio transducer 22, and the horizontal linkage 25 is driven by a horizontal transducer 23. The Transducers 22 and 23 may be acoustic suspension loudspeakers. The vertical drive lever 31 permits displacement of the two transducer units 22, 23, enabling separate control of the vertical and horizontal displacements of the mirror 17.

A particular structure for a drive transducer 22, 23 and associated drive linkage is shown in more detail in FIG. 3. The linkage consists of a spring 39 placed between two nuts 37, 41 which are mounted on a screw shaft 43 attached to a convex plate 45. The convex plate 45 is in turn attached to a plate 47 which is mounted on the high compliance edge 51 of a speaker cone 50. The plate 47 includes an aluminum upper surface 48 and a non-conductive substrate 49. This plate 47 serves to develop a capacitive feedback signal as will be described further below in conjunction with the transducer drive circuitry.

Some special considerations may be noted in construction of the mechanical transducer assembly described above. Because of the driver, mirror and mounting plate mass, the system has a strong resonance between 10 and 30 hz. Using a loudspeaker as a transducer, this resonance may be damped by sealing off the rear of the speaker and tuning a small opening to optimize response. Additionally, several types of couplings may be used to connect the transducer to the mirror drive point. They should all be stiff and free from slop in the axes of drive but very flexible in both directions orthogonal to this axes. These requirements exist because although the axes of the transducer retains a constant direction, the mirror rotates on a pivot and the axes of the drive point therefore changes in both angle and location. A stiff spring, straight spring wire or double universal joint may be used as a coupling. The latter is best because there is no spring coefficient which impedes transducer displacement.

Figure 5:
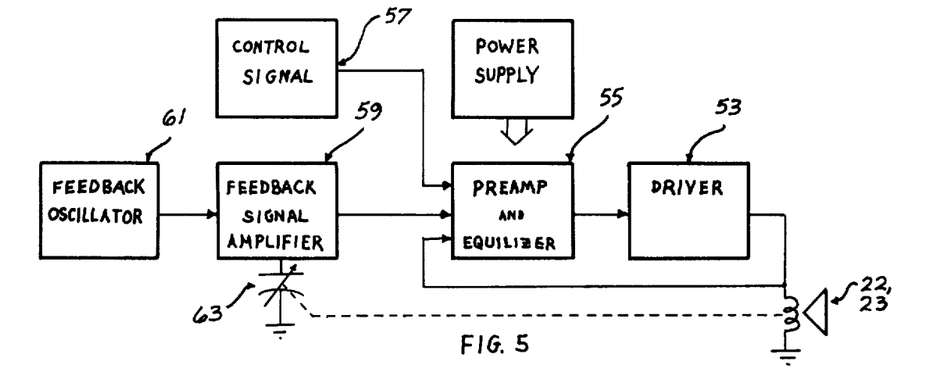
FIG. 5 is a block diagram illustrating drive circuitry for driving the audio transducer of the preferred embodiment of the invention.
Figure 6:
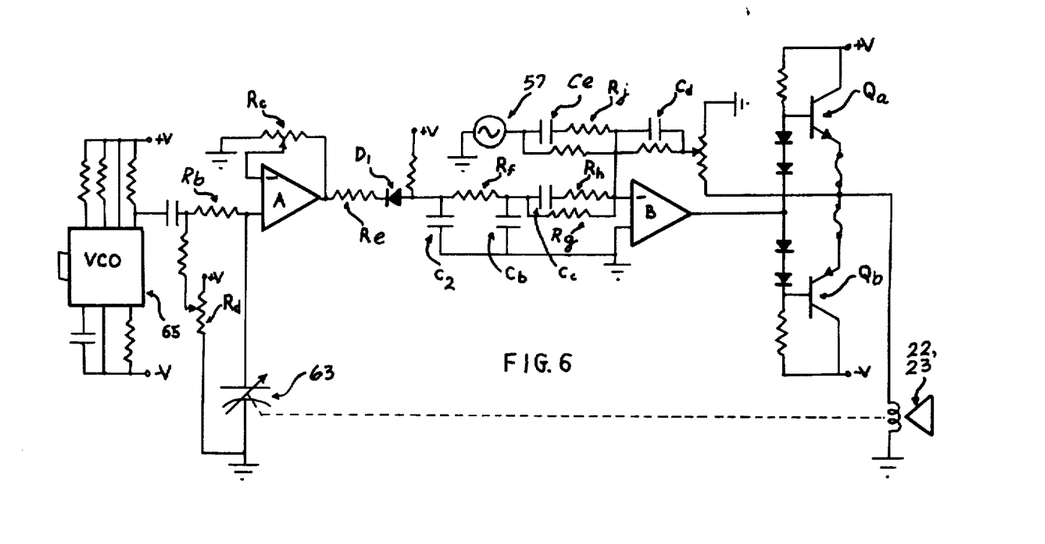
FIG. 6 is a detailed circuit diagram of one drive circuit configured according to FIG. 5.

A drive circuit for driving an audio transducer such as the illustrated audio transducers 22, 23 is shown in more detail in FIG. 5 and FIG. 6. As shown in FIG. 5, the driver circuit consists of an output driver 53, a pre-amp and equalizer circuit 55, and a feedback signal generator 59. The feedback signal generator 59 receives inputs from a feedback oscillator 61 and from a capacitive transducer incorporating plate 47 of FIG. 3 illustrated as a variable capacitor 63 in FIG. 5.

Components for implementing the structure of FIG. 5 are shown in FIG. 6. The amplifier circuit for actuating the horizontal transducer 23 is identical to the amplifier circuit for actuating the vertical transducer 22 with small variations in component values. The output stage drive 53 consists of complementary-symmetry transistors $Q_a$, $Q_b$ of the Darlington type, fused at their emitters and biased for class A operation.

The system incorporates two feedback loops. One loop feeds a portion of the output out of phase into an Op-amp B. The amount of feedback is adjusted by a resistor $R_a$ to minimize distortion and optimize system stability. The other feedback loop to Op-amp A linearizes the transducer motion and gives positional information regarding the transducer. The feedback signal to the Op-amp A is supplied by the capacitor plate 47 mounted on the audio transducer (attached to the loudspeaker cone edge), which references to the chassis plate of the transducer. A flexible wire connects the movable capacitor plate 47 (FIG. 3) to the input of the Op-amp A.

A feedback oscillator 65 operating at 200 kilohertz is applied to a resistor $R_b$ connected to the input of the second operational amplifier A. The current passing through the resistor $R_b$ varies as the value of the capacitor 63 varies due to transducer displacement, causing the 200 kilohertz voltage at the input to the second operational amplifier A to vary in amplitude with transducer displacement. The resistor $R_c$ adjusts the gain of the second operational amplifier A to give an optimum feedback level, just short of system oscillation. A resistor $R_d$ adjusts the DC level at the input of the second operational amplifier A and thus the DC component at the output. The 200 kilohertz output voltage is rectified by a diode D1 and a resistor $R_e$ and filtered by the combination of a capacitor $C_a$, resistor $R_f$ and a capacitor $C_b$. The displacement feedback signal at the connection of the resistor $R_f$ and the capacitor $C_b$ is then applied to the Op-amp B through a resistor $R_g$ and is phased corrected by the combination of the resistor $R_b$ and a capacitor $C_c$. A capacitor $C_d$ attenuates the gain of the operational amplifier B at higher frequencies. This lowers the systems susceptability to noise which causes image jitter. To compensate for the resulting 6DB/octave fall in gain, the DC control signal level which is set by resistor $R_i$ is also fed through a capacitor $C_e$ and limited by a resistor $R_j$. The control signal from a source 57 is generated by an electronic system such as will be described below, and is typically an AC signal of 20 volts peak-to-peak at frequencies below 100 hz, plus a DC voltage between $-10$ and $+10$ volts.

Before discussing the image translator control system used in the preferred embodiment of the invention for supplying a control signal 57 to drive circuitry such as that illustrated in FIGS. 5 and 6, some of the attributes of the transducer apparatus thus far disclosed will be discussed. The appearance of a projected dot reflected off the mirror 17 is of three different types: (1) The dot may appear static anywhere within the range of the mirrors deflection, $\pm 30°$ horizontally and $\pm 10°$ vertically. (2) The dot may move very slowly and smoothly in a horizontal, vertical or diagional line, or any curved line. (3) Very rapid alternations, up to 100 hz. in either or both directions may be obtained to simultaneously effect the tracing of Lissajous type figures. Some of the effects this has upon a projected slide image are as follows: (1) The image may appear anywhere within the range of the mirror 17 on the screen 21. (2) The image may appear to float across the screen. (3) An image may appear to trace abstract or geometric patterns, changing in a controllable and intriguing manner.

Thus, the image translator of the preferred embodiment is particularly useful with a slide projector. It deflects the light beam from the projector thus moving the image in a controlled manner. One voltage H in the range of $-10$ to $+10$ volts positions the image in the horizontal direction, and a second voltage V of the same range positions the image in a vertical direction. By deflection at suitable rates from a few hertz to 100 hz, the image traced repetitively appears to be formed of continuous lines and surfaces. Brightness control B for the slide projector is included as a part of the total performing visual synthesizer system.

Figure 4:
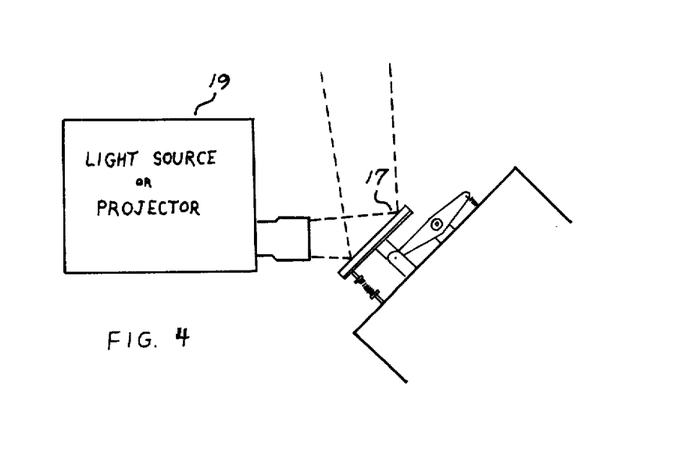
FIG. 4 illustrates the arrangement of a typical projector in conjunction with the audio transducer of the preferred embodiment of the invention.
Figure 7A:
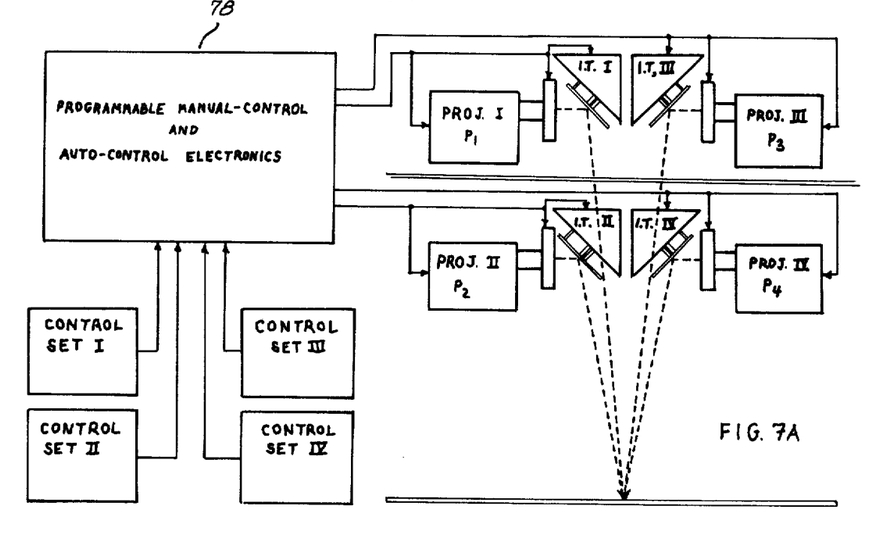
FIG. 7A is a block diagram illustrating an image translator configuration including four image projectors.
Figure 7B:
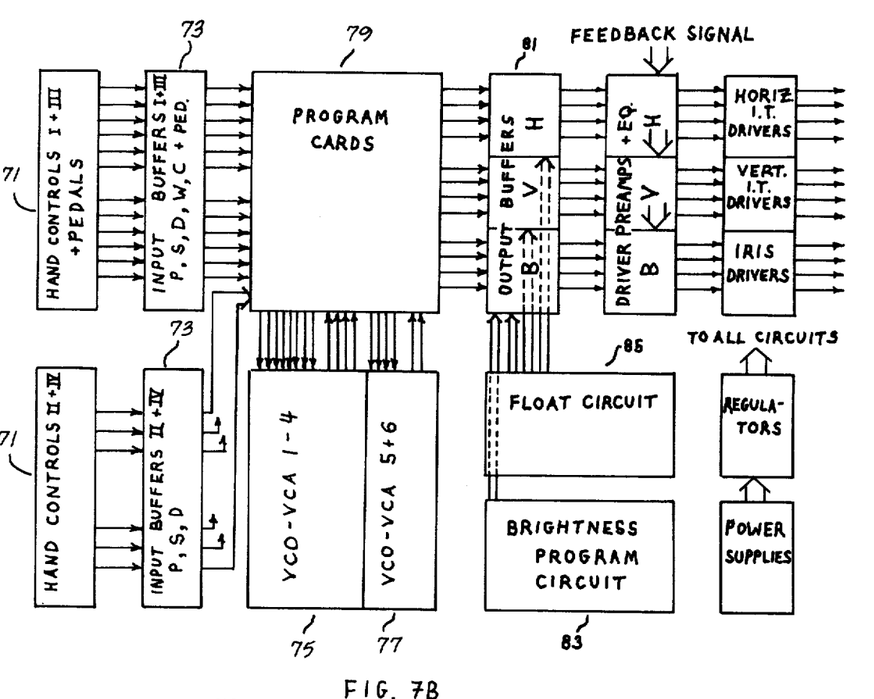
FIG. 7B is a block diagram of an image translator control system for providing control signals to drive circuitry such as that of FIG. 6 in the system of FIG. 7A.

An embodiment of a control system for providing vertical control signals V, horizontal control signals H and brightness control signals B in the desired frequency range is illustrated in FIG. 7A and 7B. This embodiment employs 4 manual control stations I, II, III, and IV, detailed further below, to actuate four image transducer-projection systems, each configured according to FIGS. 2–4. Selection of the mode of actuation of the projector systems and additional selectable automatic controlfunctions are provided by program and auto-control electronics illustrated conceptually in FIG. 7A as a block 78. These electronics 78 and their relation to the manual control apparatus is shown in more detail in FIG. 7B.

As shown in FIG. 7B, two sets of hand controls 71 provide analog control signals in the range of −10 to +10 volts at the output of a plurality of buffer ammplifiers 73. Additional control signals may be provided by 6 voltage-controlled oscillator and voltage-controlled amplifier circuits 75, 77. Simple hard wired interchangeable program cards 79 may be plugged into a signal terminal socket to assign the interconnection among the oscillator 75, 77, controls 71, and the inputs to the buffers 81. The program card 79 may provide control signals from the input buffers 73 directly to the output buffers 81 or may route those control signals to control the amplitude and frequency of selected ones of the oscillators 75, 77 whose outputs are then fed to the output buffers 81 as B, V and H control signals.

These output buffers 81 may receive additional inputs from auxiliary special function circuits 83, 85. One of these circuits, the brightness program circuit 83 offers the convenience of standardized dissolve formats controlled by a single switch, and the float circuit 85 generates a complex set of signals under manual control. All of the above elements of the control system of FIG. 7 will be discussed in greater detail in the following paragraphs.

Figure 8:
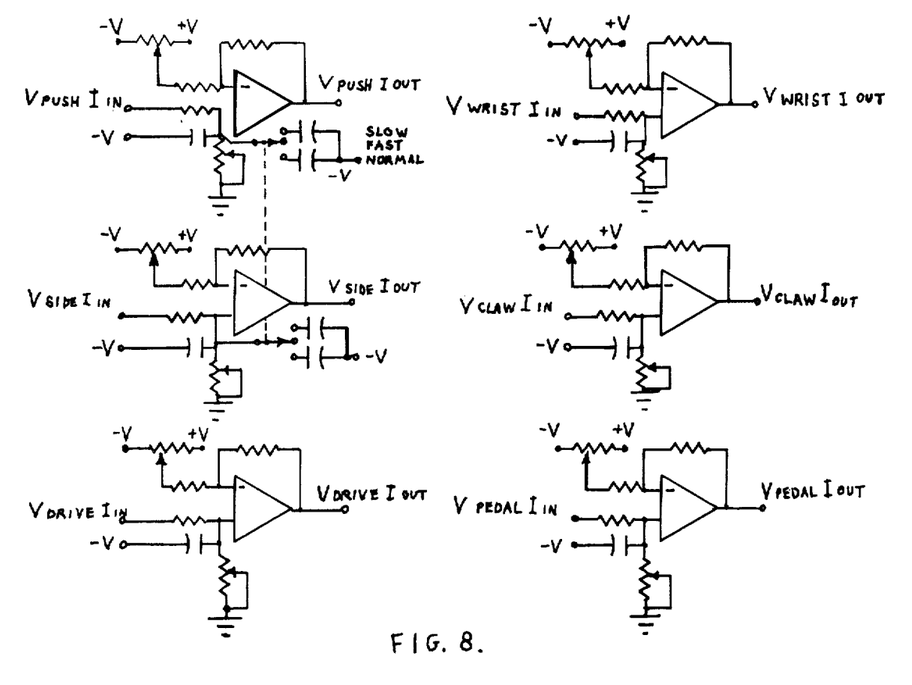
FIG. 8 is a circuit diagram of input buffers for use in the image translator control system of FIG. 7B.

A hand control for generating the hand control signals supplied by units 71 is shown in FIG. 8. Five independent proportional output voltages are obtained from the variable potentiometers mounted in each hand control assembly such as that shown in FIG. 8. Two translational outputs are obtained from a conventional joy-stick control 91. These are denoted PUSH (P) and SIDE (S). Three rotational outputs are obtained from the three possible torsional motions of an anatomical handle actuator assembly 90 mounted at the end 92 of the joy-stick assembly 91.

The handle assembly 90 includes three pots 96, 97, 98 for developing the torsional output signals, an interconnecting member 95 and an anatomical handle 93. The first potentiometer 97 is mounted on a shaft 99 parallel to the axes of the joy-stick shaft 92. The rectangular interconnecting member 95 is connected to the shaft of the potentiometer 97 and to the body of the potentiometer 96 such that the axes of the potentiometer 96 lies perpendicular to the axes of the potentiometer 97. The shaft of the potentiometer 96 is connected to a rigid member 100, and the shaft of the potentiometer 98 is connected to the rigid member 100 such that the axes of its control shaft is perpendicular to both the axes of the potentiometer 96 and potentiometer 97. The anatomical handle 93 is then mounted to the body of the potentiometer 98.

Operation of the hand control assembly 90 thus provides three additional control signals in the following manner. The handle 93 is grasped in a hand-shake position. Rotation of the handle on the axis of the operator's arm is called DRIVE (D) (as in the use of a screw driver). Rotation about an axis through palm is called WRIST (W) because the movement is felt primarily in the wrist. Rotation around the axis of the joy-stick shaft is called CLAW (C), because the fingers follow a clawing action. Polarities of the signals are indicated in the diagram of FIG. 8. Motion of the handle may thus rotate the body of potentiometer 98, the shaft of potentiometer 96 and the shaft of potentiometer 97. Such rotations are held within 90°.

The particular joy-stick shown in FIG. 8 is an assembly designed particularly for the left hand. The right hand control is the mirror of that shown in FIG. 8, and polarities of CLAW and DRIVE are opposite for the right hand. Additionally a pair of standard foot pedals is used to generate control voltages PED.

Figure 9:
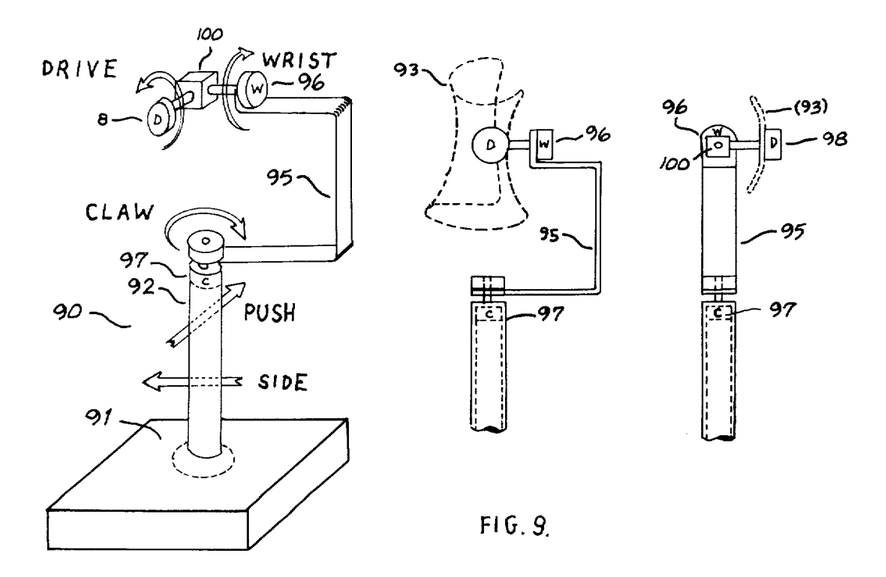
FIG. 9 illustrates a hand control structure for use in the image translator control system of FIG. 7B.

The 6 control voltages from each handle assembly and foot pedal P,S,D,W,C. PED are amplified with non-inverting Op-amp buffers illustrated in FIG. 9 so that their zero position gives zero output voltages, and full positive and negative movement or rotation yield −10 and +10 volts respectively. Frequency range of the control signals is limited to about 10 hz. to minimize pot noise. In addition, the translational outputs (P and S) have selectable capacitors $C_1$ to limit the top frequency to 1 hz. on NORMAL and 0.1 on SLOW. The output resistance of the buffers is less than 100 ohms.

Figure 10:
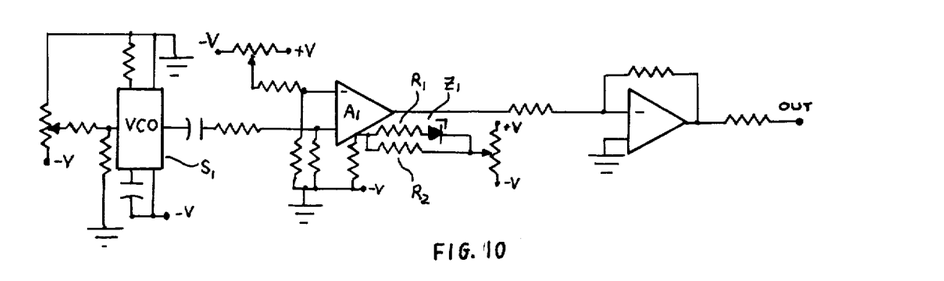
FIG. 10 is a circuit design of the structure of one of four voltage control frequency and amplitude function generators for use in the image translator control system of FIG. 7B.

The four oscillator circuits 75 which may be selected to feed the program card 79 are as shown in FIG. 10. As there indicated, a voltage-control function generator $S_1$ produces a triangular voltage waveform whose amplitude is determined by a voltage-controlled operational transconductance amplifier (OTA). A non-linearizing circuit consisting of a 15K resistor $R_1$ in a series with a 10 volt zener diode $Z_1$ in parallel with a 680K resistor $R_2$ causes amplitude control to take place in two ranges, small and large. The buffered output covers a range of −10 to +10 volts. As before noted, the control signal supplied to the oscillator $S_1$ and the amplitude signal supplied to the amplifier $A_1$ are supplied through a program card interconnection to one of the buffered outputs of the controls 71. Thus, manual control of the amplitude and frequency signals which provide rapid image scanning is provided. Alternatively, the amplitude and control signals could come from an oscillator.

Figure 11:
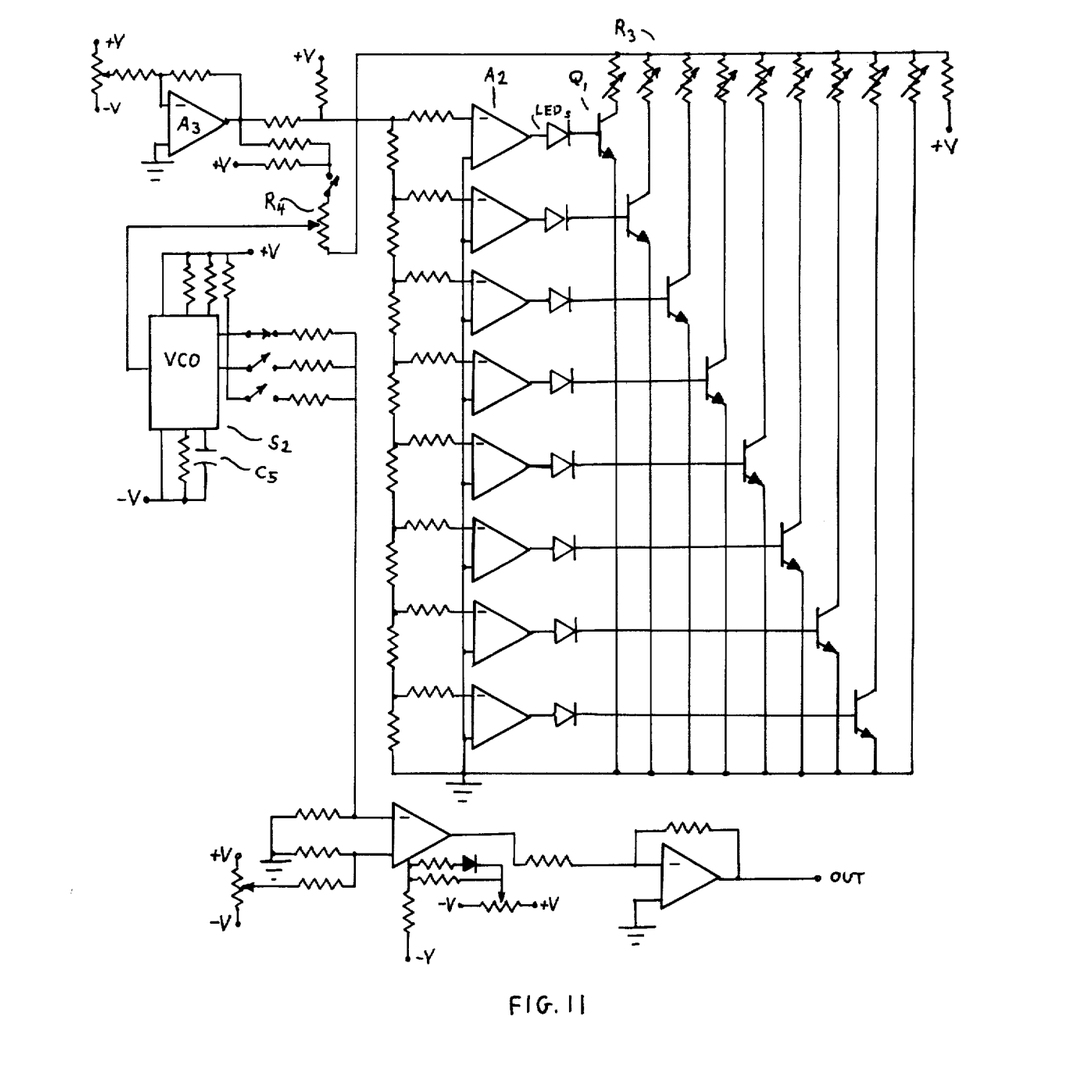
FIG. 11 illustrates one of two function generators with voltage controlled frequency and amplitude output, continuous/tunable step frequency, selectable waveforms, and audio output option, which may be utilized in the image translator control system of FIG. 7B.

The other two oscillator circuits 77 supplying the program card 79 are illustrated in FIG. 11. These circuits are essentially the same circuit as that of FIG. 10 with two important differences. An eight stage voltage comparator circuit including 8 comparing amplifiers $A_2$ is used to convert the continuous input signal from an amplifier $A_3$ into an 8 step output with LED's indicating which outputs are activated. Switching transistors $Q_1$ are turned on in sequence, tying in variable resistors $R_3$ one after the other. These resistors $R_3$ are tuned to produce voltages at the VCO control inputs which produce desired preset frequencies. The step-slur pot $R_4$ determines whether the steps have flat tops, sloping tops, or a continuous slope with no steps at all. The purpose of this is to effect the discrete change of Lissajous shapes with references to some fixed vertical frequency, a continuous change over a narrow range around the fixed frequencies, or a continuous change in the horizontal frequency. Additionally, it may be seen that the VCO provides four different selectable wavefoms: sine, triangle, square and pulse. By using switched timing capacitors denoted $C_5$, the circuitry of FIG. 11 may be used as a rudimentary sound synthesizer with an LED indicated audio output provided by output amplifying circuitry, which in the preferred embodiment includes amplifiers $A_3$ and $A_4$.

Figures 12A, 12B:
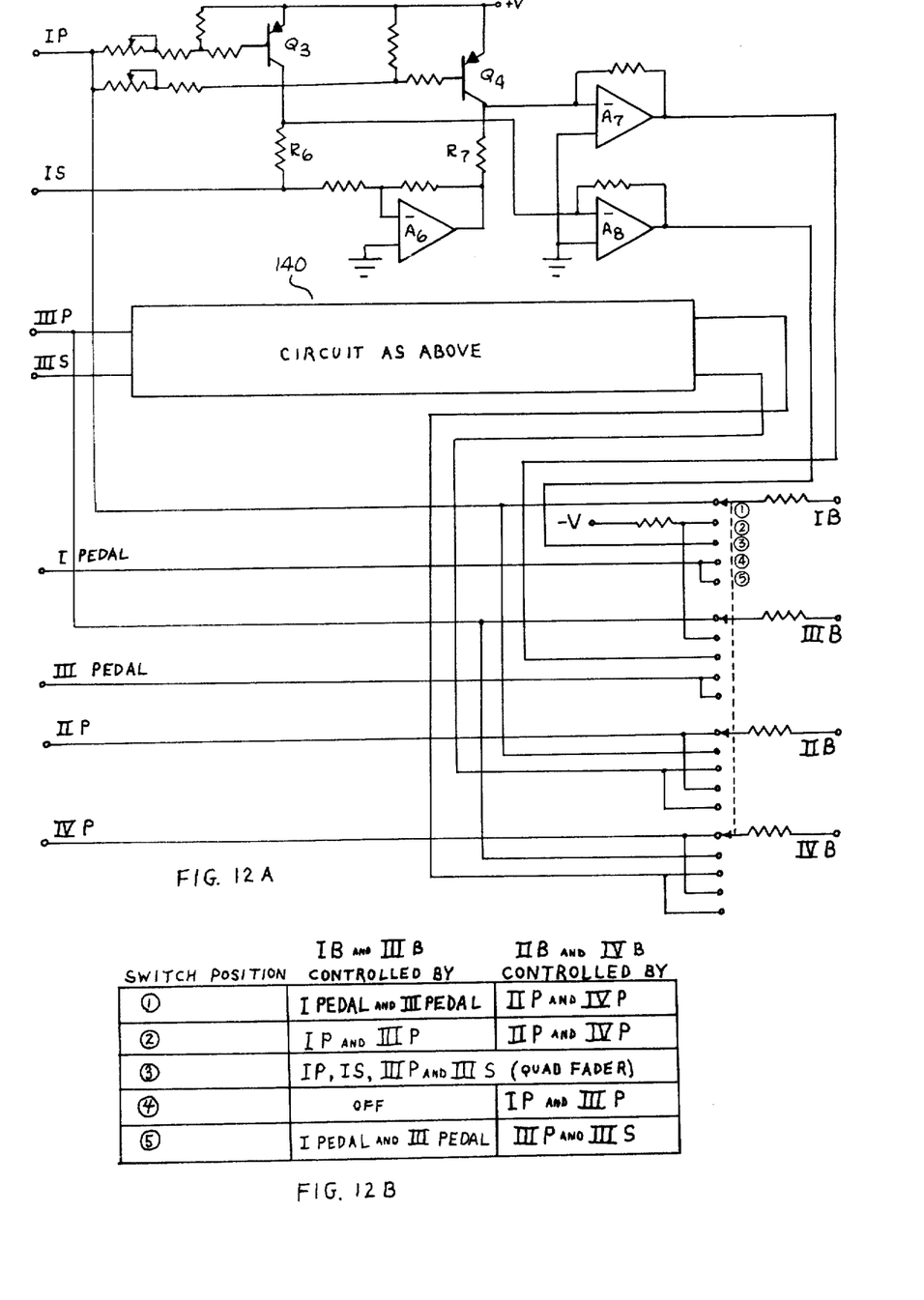
FIG. 12A is a circuit diagram of a brightness program circuit for use in the image translator control system of FIG. 7B
FIG. 12B is a table illustrating options available with the brightness program circuit.

When performing with an image translator system configured as in FIG. 7A, an auxiliary brightness control circuit 83 may be employed. The table of FIG. 12B summarizes the five manually selectable brightness control options provided by the brightness program circuit illustrated in FIG. 12A. In that table, numerals IB, IIB, IIIB and IVB correspond to respective brightness control signals for projectors P1, P2, P3 and P4. The designations I PED and III PED refer to the pedal control signals developed by the hand control and pedal mechanisms I and III of FIG. 1B, which have been discussed above in detail with respect to FIGS. 7, 8 and 9. The designations IP, IIP, IIIP and IVP represent the PUSH control signals developed by respective ones of the four hand controls I, II, III and IV. The signals IS and IIIS refer to the SIDE signals developed by respective hand controls I and III.

The first manual control option is indicated by switch position 1 in table 12B. In this mode, brightness control signals IB and IIIB are operated as a pair by one performer from the pedals while brightness control signals IIB and IVB are operated by another performer from his PUSH controls. This permits fixed slide-pair dissolves with superimposed image translator displays.

In the second mode indicated by the switch position 2, all four projectors $P_1$, $P_2$, $P_3$ and $P_4$ are used in fixed alternating dissolves by two operators, usually in the sequence 1-2-3-4, but with the option of any desired order or combination.

Figure 13A:
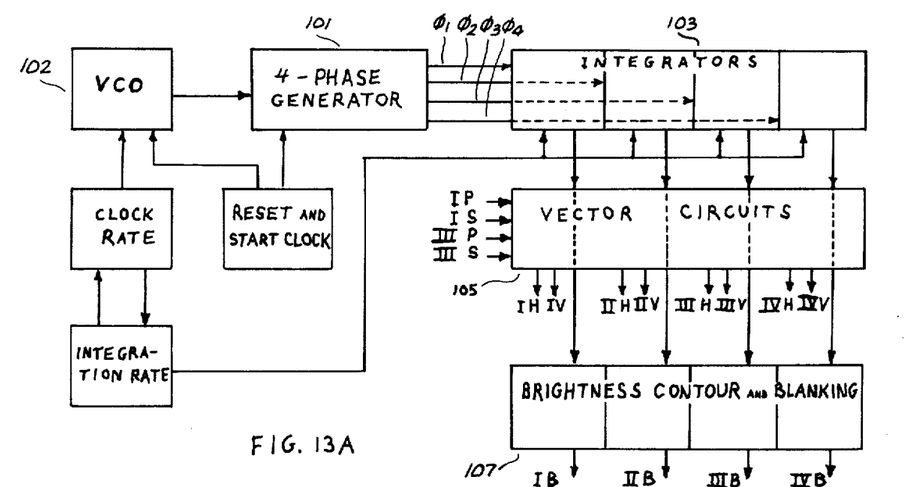
FIG. 13A is a block diagram illustrating phase clock float circuit and brightness, contour and blanking controls for use in the image translator system of FIG. 7B and FIGS. 13B, 13C and 13D are circuit diagrams of blocks of FIG. 13A.

In the third mode indicated by switch position 3, a single performer may simultaneously control the brightness of all four projectors $P_1$, $P_2$, $P_3$, $P_4$. The circuitry necessary to enable such control is indicated in FIG. 13A and operates as follows: Signals IS, IP are fed into one of two identical circuits and the inversion of IS is generated by an Op-amp $A_6$. The signal IP is used to control the amount each of two transistors $Q_3$, $Q_4$ is conducting. The respective collector bias signals on the transistors $Q_3$, $Q_4$ are IS and IS inverse, which are supplied through load resistors $R_6$ and $R_7$. If IP is $-10$ volts, both transistors $Q_3$, $Q_4$ conduct and both collector voltages sit at $+10$ volts regardless of IS. The outputs from the buffer Op-amp inverters $A_7$, $A_8$ are then $-10$ volts. If the signal IP is sufficiently positive, the transistors $Q_3$, $Q_4$ do not conduct in their collector voltages become the same as IS and IS inverse. Thus, the image brightness due to the control signals IB and IIIB is zero when the joy-stick 92 of FIG. 8 is pulled all the way back. IB increases as the joy-stick 92 is pushed forward to the left, and decreases as it is moved to the right, at the same time increasing the brightness of projector III. Placing the joy-stick forward in the middle causes equal brightness of verying degrees. Signals IIIP and IIIS control the brightness of projectors II and IV by analogous operation of the identical other circuit 140.

In a fourth mode selected by switch position 4, the operating controls I and III may control the brightness of projectors P2 and P4. In the fifth mode selected by position 51, the performer may operate the brightness controls with the pedals while operating the fixed projector pair with the right joy-stick as in the fourth mode.

In operating the image translator system embodiment of FIG. 7B, certain desirable functions proved too complex for totally manual operation; thus, the float circuit 85 of FIG. 7B was designed for sequential operation of complex displays, still under performer control. A block diagram of the float circuit 85 is shown in FIG. 13A. The VCO 100 is manually started and operates continuously at a rate determined by the performer. This VCO 100 feeds a four-phase generator 101 which produces successive pulses on its four output lines $\phi_1$, $\phi_2$, $\phi_3$, $\phi_4$ when it is operating. Four integraters 103 turn these pulses individually to ramps of lengths commensurate to the clock rate of the VCO 100. Each of these ramps is fed to a respective vector circuit 105. Each vector circuit 105 is responsive to one of the control voltages IV, IS, IIP, IIIP, IIIS to cause the ramps to vary between a unity-sized ramp. The outputs of the vector circuits 105 serve as respective vertical and horizontal control signals for each of the respective four projectors $P_1$, $P_2$, $P_3$, $P_4$.

The ramp and inverse ramp signals supplied by the integraters 103 are also supplied to respective brightness contour and blanking circuits 107. Each of these circuits 107 generates a trapezoidal voltage waveform which causes an image to gradually appear as it begins to move across a projection screen, reach full brightness, and then fade away as it reaches the other side of the screen, staying off while the integrator is reset. The rate of appearance and disappearance of the image is voltage controlled by the SLOPE inputs.

Figure 13B:
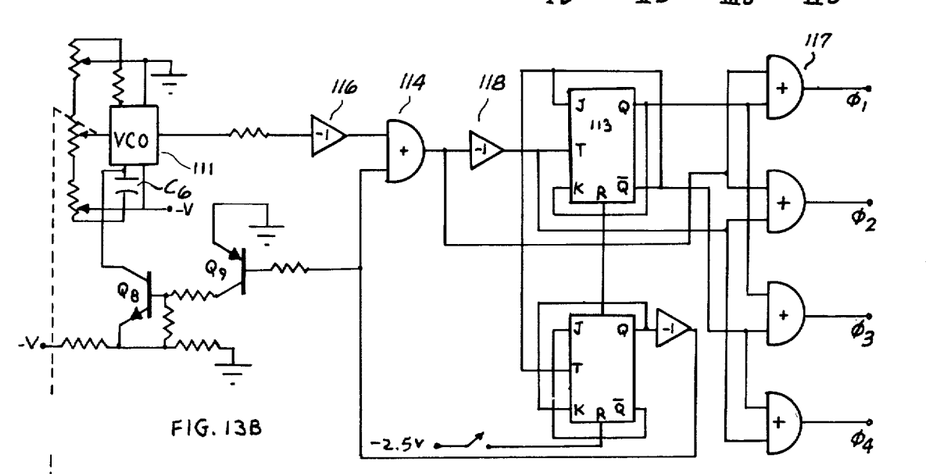
Figure 13C:
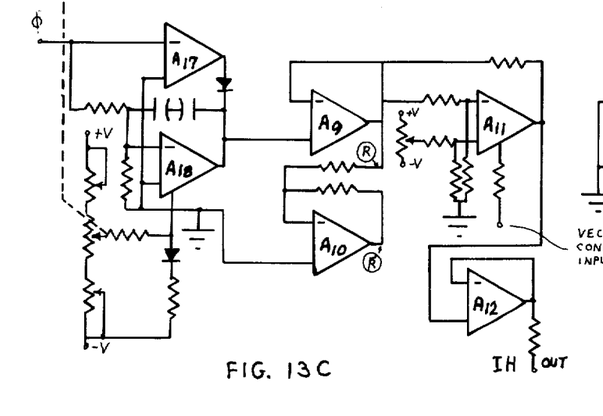
Figure 13D:
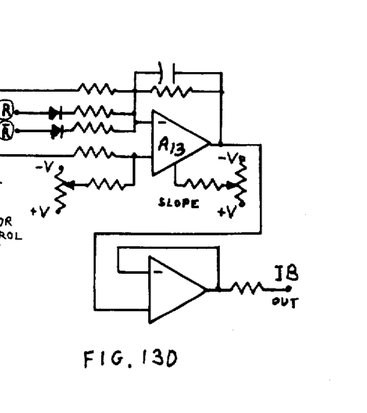

Particular circuitry for implementing the blocks of FIG. 13A is shown in FIGS. 13B, 13C and 13D. The four phase clock generator of FIG. 13B includes a VCO 111 with a settable clock rate which feeds a clock pulse signal to logic circuitry including an inverter 116, an AND gate 114, a second inverter 118, two J-K flip-flops 113, 115 and four output AND gates 117. This logic circuitry is connected to provide four, phased outputs at the outputs of the AND gates 117. In order to begin the VCO 111 at the same point in the cycle each time it is started, a reset circuit including two transistors $Q_8$, $Q_9$ is used to preset the charge on the VCO timing capacitor $C_6$.

An integrator circuit 103 and associated vector circuit 105 is illustrated in FIG. 13C. As there shown, an amplifier $A_7$ is supplied with one of the phased clock signals $O_1$. The signal $O_1$ is also supplied to the negative input of a second amplifier $A_8$ which outputs through a diode to a common point with the output of the amplifier $A_7$. The integration rate is controlled by a control level applied to a bias terminal of the amplifier $A_7$. The ramp output signal at the output of the amplifier $A_7$ is then fed to a buffer amplifier $A_9$ and inverted by another amplifier $A_{10}$. The uninverted ramp signal is then supplied to an amplifier $A_{11}$. One of the signals IP, IS, IIIP or IIIS is fed to the control input of the amplifier $A_{11}$ to cause the shifting angle at the output of an amplifier $A_{12}$.

The brightness contour and blanking circuitry is illustrated in more detail in FIG. 13D. As there shown the ramp and inverse ramp signals are supplied to the negative input of an amplifier $A_{13}$ which combines the ramp and inverted ramp into a trapezoid at its output. The SLOPE control signal is applied to the control terminal of the amplifier $A_{13}$ to control the rate of appearance and disappearance of an image on the screen. This SLOPE signal is typically although not necessarily a preset level.

Figure 14:
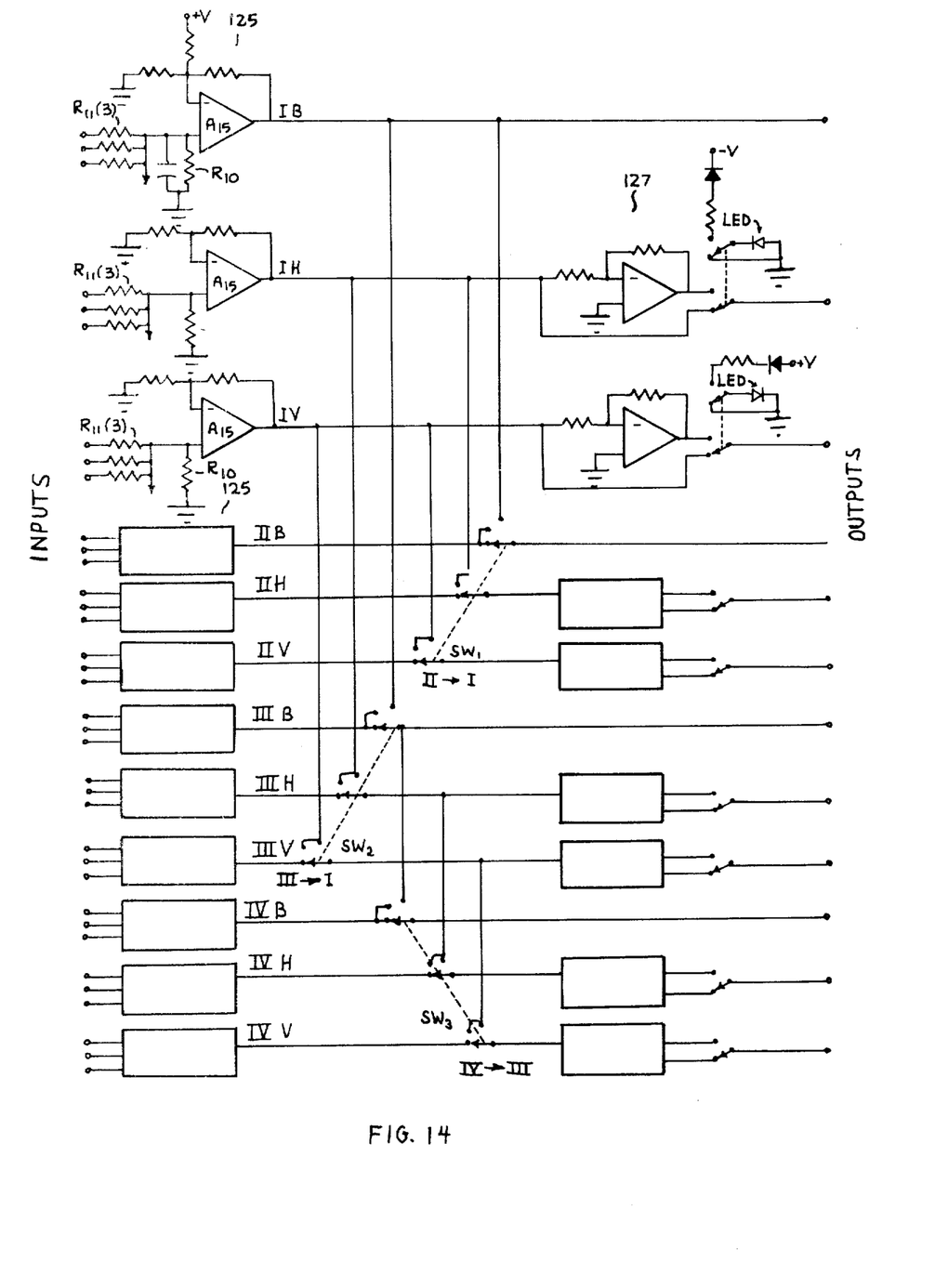
FIG. 14 is a circuit diagram of the output buffers used in the image translator control system of FIG. 7.

After the control signals for the functions of brightness B, horizontal H and vertical V for each of the four projector-image translator devices (I, II, III and IV) are developed either by the float and brightness circuits 85, or 83 or directly from the program card 79, they are amplified by the 12 output buffers 125 shown in FIG. 14. In addition, the H and V outputs are fed into inverters 127. Colored LED indicators show the states of these outputs by illuminating when the output is switched to invert.

At the input to each buffer amplifier A15 is a 150 ohm resistor R10. Multiple signals may be applied to this point through source resistors of 2.2K without significantly effecting each other or the buffer gains.

Three-positions switches SW1, SW2, SW3 with LED state indicators are employed to operate the system normally or operate to H and V output pairs from III and V source or operate two B, H, V output trios from one B, II and V source trio. These three switches link III to I, II2 to I or IV to II. Thus, the output buffers are programmable to effect parallel or complementary movement of translated images operated from control sets I-III or II-IV. This arrangement is very useful in creating some interesting visual patterns which could not be achieved by a completely manual control.

As may now be appreciated, the subject invention provides both human and automatic control of manipulation of images supplied from a projector system to an image screen. Diverse operator manipulations are provided as well as automatic movement and dissolution of the images. The element of human control provides for the production of images limited only by the skill and imagination of the operator while the automatic circuitry provides functions beyond the reach of human skill.

The subject invention has many uses. For example, it may be used as a light sculpture instrument in kinetic art. Versions of the configured according to the invention may also prove suitable in commercial uses as a toy or "light box" element. Additionally the subject invention may find use in stage lighting and in providing special effects for TV or motion pictures.

It should be apparent from the diverse circuitry disclosed above that control devices using the teachings of the subject invention may be configured other than as specifically described in the discussion of the preferred embodiments of the invention. Therefore it should be understood that within the scope of the appended claims, the invention may be practiced other than as specifically disclosed here.

What is claimed is:

1. An image translation device adapted for use as an artistic tool for creating light images in response to the manipulations of an artist operator comprising:

an image reflector means mounted to be pivotable about first and second axes;

a control means grippable by the operator's hand and pivotable in response to operator arm movement for developing first and second control signals proportional to said arm movement and further responsive to a plurality of operator wrist movements for developing third and fourth control signals each proportional to a respective said wrist movement;

signal generating means for generating a first electrical signal having an amplitude and frequency and a second electrical signal having an amplitude and frequency, said signal generating means also controlling the amplitude and frequency of said first electrical signal to vary in response to respective first and second said control signals and controlling the amplitude and frequency of said second electrical signal to vary in response to respective third and fourth said control signals;

means for converting said first electrical signal into a force variable at a frequency and amplitude proportional to the frequency and amplitude of said first electrical signal and for converting said second electrical signal into a force variable at a frequency and amplitude proportional to the frequency and amplitude of said second electrical signal; and means controlled by said first and second forces for oscillating said reflector means about said first and second axes respectively at said frequencies and in proportion to said amplitudes.

2. The image translation device of claim 1 wherein said control means comprises:

a pivotable shaft;

transducer means for converting pivotal motion of said shaft into said first and second control signals; and means mounted to said shaft and adapted to be gripped by a human hand for developing said third control signal proportional to rotational movement about a first axis, said fourth control signal proportional to wrist rotation about a second axis, and a fifth control signal proportional to wrist rotation about a third axis.

3. The apparatus of claim 1 further including means for controlling said first and second electrical signals to determine the reference origin of said light beam.

4. The apparatus of claim 1 wherein said frequencies of said first and second electrical signals are selected from the range including zero to 100 Hz.

5. The apparatus of claim 4 further including feedback means for stabilizing the motion of said reflector means.

6. The apparatus of claim 4 further including:

means selectable for automatically stepping the magnitude of at least one of said first and second electrical signals to produce a stepped control signal; and means for producing a step change in the frequency of at least one of said first and second electrical signals in response to said stepped control signal.

7. The apparatus of claim 6 further including means for controlling the slope of said step change in the frequency.

8. The apparatus of claim 4 further including means selectable for automatically controlling said reflector means to cause said beam to traverse a projection surface.

9. The apparatus of claim 8 further including means cooperting with said automatic controlling means for automatically controlling the brightness of said beam as it traverses.

10. The apparatus of claim 9 wherein said automatic brightness controlling means causes said beam to gradually appear and disappear.

11. The apparatus of claim 10 further including means for controlling the rate of said appearance and disappearance.

12. An image translation device adapted for use as an artistic tool for creating light images in response to the manipulations of an artist operator comprising:

an image reflector means mounted to be pivotable about first and second axes;

a control means pivotable in response to a first operator movement for developing first and second control signals proportional to said first movement and further responsive to a second operator movement for developing third and fourth control signals varying in accordance with said second movement;

signal generating means for generating a first electrical signal having an amplitude and frequency and a second electrical signal having an amplitude and frequency, said signal generating means also controlling the amplitude and frequency of said first electrical signal to vary in response to respective first and second said control signals and controlling the amplitude and frequency of said second electrical signal to vary in response to respective third and fourth said control signals;

means for converting said first electrical signal into a force variable at a frequency and amplitude proportional to the frequency and amplitude of said first electrical signal and for converting said second electrical signal into a force variable at a frequency and amplitude proportional to the frequency and amplitude of said second electrical signal; and means controlled by said first and second forces for oscillating said reflector means about said first and second axes respectively at said frequencies and in proportion to said amplitudes.

* * * * *